(12) United States Patent
Stokes (10) Patent No.: US 12,532,962 B1
(45) Date of Patent: Jan. 27, 2026

(54) MODULAR CABINET FOR USE WITH MOBILE STORAGE RECEPTACLES

(71) Applicant: John Stokes, Charlotte, NC (US)

(72) Inventor: John Stokes, Charlotte, NC (US)

( * ) Notice: Subject to any disclaimer, the term of this patent is extended or adjusted under 35 U.S.C. 154(b) by 287 days.

(21) Appl. No.: 17/674,039

(22) Filed: Feb. 17, 2022

(51) Int. Cl.
| | |
|---|---|
| *A47B 47/00* | (2006.01) |
| *A47B 47/02* | (2006.01) |
| *A47B 96/02* | (2006.01) |
| *A47B 96/06* | (2006.01) |
| *A47B 96/20* | (2006.01) |

(52) U.S. Cl.
CPC ...... *A47B 47/0075* (2013.01); *A47B 47/0091* (2013.01); *A47B 47/024* (2013.01); *A47B 47/025* (2013.01); *A47B 96/021* (2013.01); *A47B 96/06* (2013.01); *A47B 96/201* (2013.01)

(58) Field of Classification Search
CPC . A47B 47/00; A47B 47/0066; A47B 47/0075; A47B 47/0091; A47B 47/02; A47B 47/021; A47B 47/024; A47B 47/025; A47B 47/042; A47B 47/047; A47B 96/02; A47B 96/021; A47B 96/06; A47B 96/20; A47B 96/201; A47B 95/008; B25H 3/02; B25H 3/021; B25H 3/022; B25H 3/04; B25H 3/06
See application file for complete search history.

(56) References Cited

U.S. PATENT DOCUMENTS

| | | | | |
|---|---|---|---|---|
| 1,055,697 | A * | 3/1913 | Beecher | A47B 87/02 52/223.6 |
| 1,806,610 | A * | 5/1931 | Christensen | A47B 47/03 312/351 |
| 2,727,800 | A * | 12/1955 | Snider | A47B 61/00 312/263 |
| 3,749,465 | A * | 7/1973 | Newcomer | F16B 12/22 312/263 |
| 4,023,682 | A | 5/1977 | Niece | |
| 4,401,222 | A * | 8/1983 | Kulikowski | A47F 5/0025 211/94.01 |
| 5,758,585 | A * | 6/1998 | Latchinian | A47F 5/0846 362/127 |
| 5,848,711 | A * | 12/1998 | Schmit | A47B 96/00 312/246 |

(Continued)

FOREIGN PATENT DOCUMENTS

| | | | | |
|---|---|---|---|---|
| DE | 20219074 | U1 * | 5/2003 | ........... A47B 95/008 |
| DE | 202008013009 | U1 * | 12/2008 | ........... F16B 45/008 |

(Continued)

*Primary Examiner* — Andrew Roersma
(74) *Attorney, Agent, or Firm* — Kyle A. Fletcher, Esq.

(57) ABSTRACT

The modular cabinet for use with mobile storage receptacles includes a shelf, a side wall, a mounting bracket, and a rear mounting panel. One or more of the shelves, one or more of the side walls, one or more of the mounting brackets, one or more of the rear mounting panels, or any combination thereof may be assembled into a modular cabinet operable to retain one or more mobile storage receptacles. A plurality of engaging members on the mobile storage receptacle may engage with the shelf or with the rear mounting panel to retain the mobile storage receptacle to the modular cabinet. In some embodiments, a locking tab on the mobile storage receptacle may engage a lock cut out on the modular cabinet to prevent the mobile storage receptacle from decoupling.

16 Claims, 10 Drawing Sheets

(56) References Cited

U.S. PATENT DOCUMENTS

| | | | |
|---|---|---|---|
| D424,355 S | 5/2000 | Barton | |
| 8,398,184 B1 | 3/2013 | Benneche | |
| 9,725,209 B1 | 8/2017 | Zion | |
| 10,021,973 B1 * | 7/2018 | Will | A47B 47/042 |
| 10,434,638 B1 | 10/2019 | Tsai | |
| 10,583,962 B2 * | 3/2020 | Brunner | A45F 3/10 |
| 10,981,696 B2 | 4/2021 | Brunner | |
| 11,612,998 B1 * | 3/2023 | Byington | B25H 3/028 |
| | | | 211/126.1 |
| 11,840,269 B2 * | 12/2023 | Brunner | B62B 1/002 |
| 11,882,929 B2 * | 1/2024 | Blumenthal | A45C 5/14 |
| 2014/0252057 A1 * | 9/2014 | Workman | A47B 47/0091 |
| | | | 224/565 |
| 2020/0165036 A1 * | 5/2020 | Squiers | A45C 7/0045 |
| 2021/0221561 A1 | 7/2021 | Davidian | |
| 2022/0018635 A1 * | 1/2022 | Ahle | F41H 5/14 |
| 2022/0117393 A1 * | 4/2022 | Jenkins | B25H 3/04 |
| 2022/0402113 A1 * | 12/2022 | Brunner | B25H 1/06 |
| 2023/0036215 A1 * | 2/2023 | Williams | B25H 3/04 |
| 2024/0009829 A1 * | 1/2024 | Schwei | A47B 47/0091 |

FOREIGN PATENT DOCUMENTS

| | | | | |
|---|---|---|---|---|
| DE | 102009049929 B3 * | 6/2011 | | A47B 95/008 |
| EP | 3622857 B1 * | 10/2020 | | A47B 95/008 |
| WO | WO-2007080367 A1 * | 7/2007 | | A47B 47/042 |

\* cited by examiner

MODULAR CABINET FOR USE WITH MOBILE STORAGE RECEPTACLES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of storage systems and modular cabinets, more specifically, a modular cabinet for use with mobile storage receptacles.

SUMMARY OF INVENTION

The modular cabinet for use with mobile storage receptacles comprises a shelf, a side wall, a mounting bracket, and a rear mounting panel. One or more of the shelves, one or more of the side walls, one or more of the mounting brackets, one or more of the rear mounting panels, or any combination thereof may be assembled into a modular cabinet operable to retain one or more mobile storage receptacles. As non-limiting examples, the mobile storage receptacles may be tool boxes and/or storage crates that are operable to hold tools and/or supplies. A plurality of engaging members on the mobile storage receptacle may engage with the shelf or with the rear mounting panel to retain the mobile storage receptacle to the modular cabinet. In some embodiments, a locking tab on the mobile storage receptacle may engage a lock cut out on the modular cabinet to prevent the mobile storage receptacle from decoupling. The modular cabinet may be installed at any venue where retaining the mobile storage receptacles is required and may be particularly beneficial where movement and vibration may cause the mobile storage receptacles to slide. As non-limiting examples, the invention may have great utility in a vehicle.

An object of the invention is to provide a modular cabinet comprising one or more shelves, one or more side walls, one or more mounting brackets, one or more rear mounting panels, or any combination thereof.

Another object of the invention is to provide a plurality of shelf slots and a plurality of rear panel slots for engaging a plurality of engaging members on mobile storage receptacles.

A further object of the invention is to provide one or more shelf lock cut outs on shelves and/or one or more rear panel lock cut outs on rear mounting panels for engaging locking tabs on mobile storage receptacles.

Yet another object of the invention is to provide shelves and rear mounting panels that are single wide and double wide to accommodate single width storage receptacles and double width storage receptacles respectively.

These together with additional objects, features and advantages of the modular cabinet for use with mobile storage receptacles will be readily apparent to those of ordinary skill in the art upon reading the following detailed description of the presently preferred, but nonetheless illustrative, embodiments when taken in conjunction with the accompanying drawings.

In this respect, before explaining the current embodiments of the modular cabinet for use with mobile storage receptacles in detail, it is to be understood that the modular cabinet for use with mobile storage receptacles is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the modular cabinet for use with mobile storage receptacles.

It is therefore important that the claims be regarded as including such equivalent construction insofar as they do not depart from the spirit and scope of the modular cabinet for use with mobile storage receptacles. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 10.

The modular cabinet for use with mobile storage receptacles 100 (hereinafter invention) comprises a shelf 200, a side wall 230, a mounting bracket 240, and a rear mounting panel 260. One or more of the shelves 200, one or more of the side walls 230, one or more of the mounting brackets 240, one or more of the rear mounting panels 260, or any combination thereof may be assembled into a modular cabinet 290 operable to retain one or more mobile storage receptacles 900. As non-limiting examples, the mobile storage receptacles 900 may be tool boxes 902 and/or storage crates 904 that are operable to hold tools and/or supplies. A plurality of engaging members 910 on the mobile storage receptacle 900 may engage with the shelf 200 or with the rear mounting panel 260 to retain the mobile storage receptacle 900 to the modular cabinet 290.

In some embodiments, a locking tab 920 on the mobile storage receptacle 900 may engage a lock cut out on the modular cabinet 290 to prevent the mobile storage receptacle 900 from decoupling. The modular cabinet 290 may be installed at any venue where retaining the mobile storage receptacles 900 is required and may be particularly beneficial where movement and vibration may cause the mobile storage receptacles 900 to slide. As non-limiting examples, the invention 100 may have great utility in a vehicle.

Figure 1:
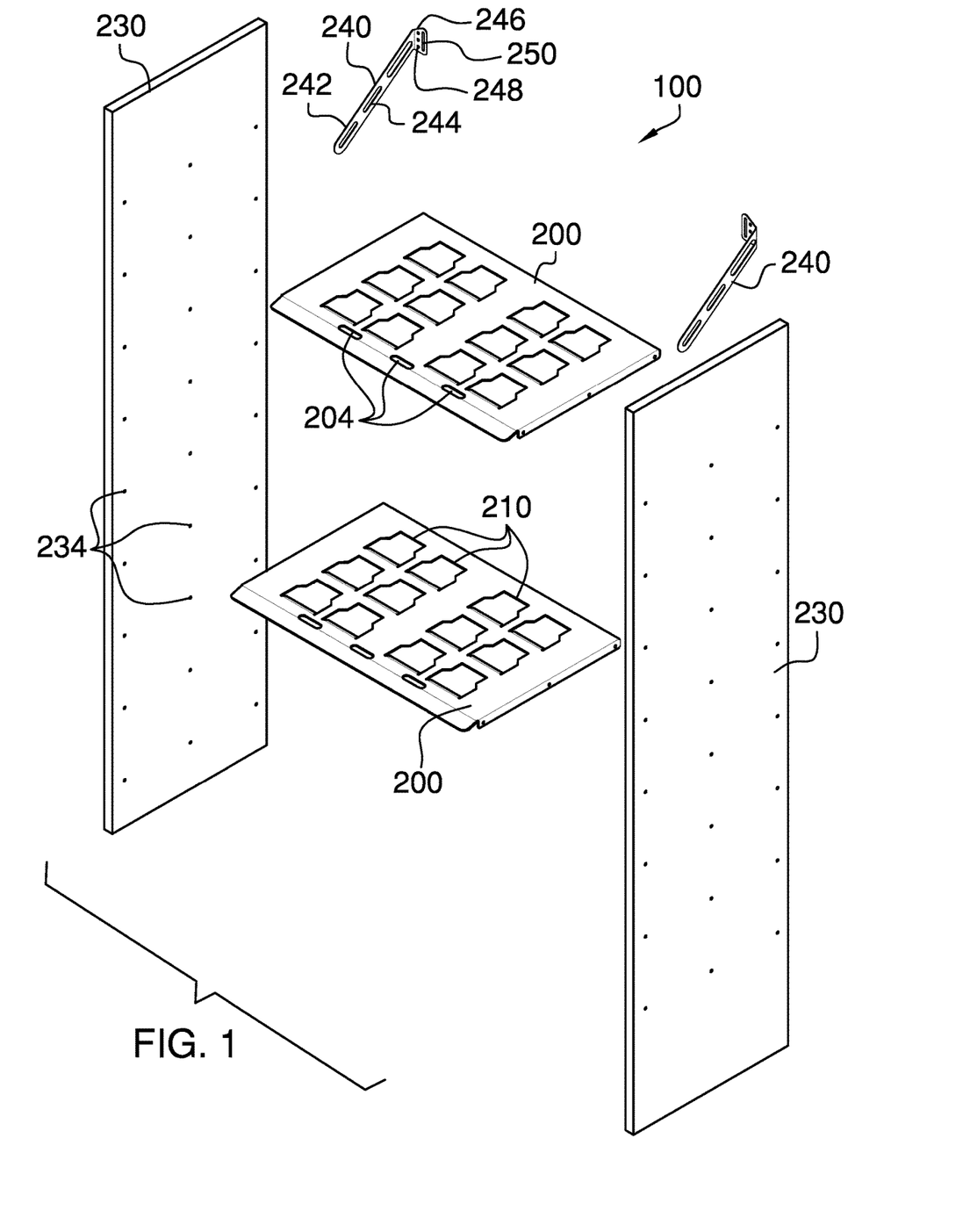
FIG. 1 is an isometric view of an embodiment of the disclosure.
Figure 2:
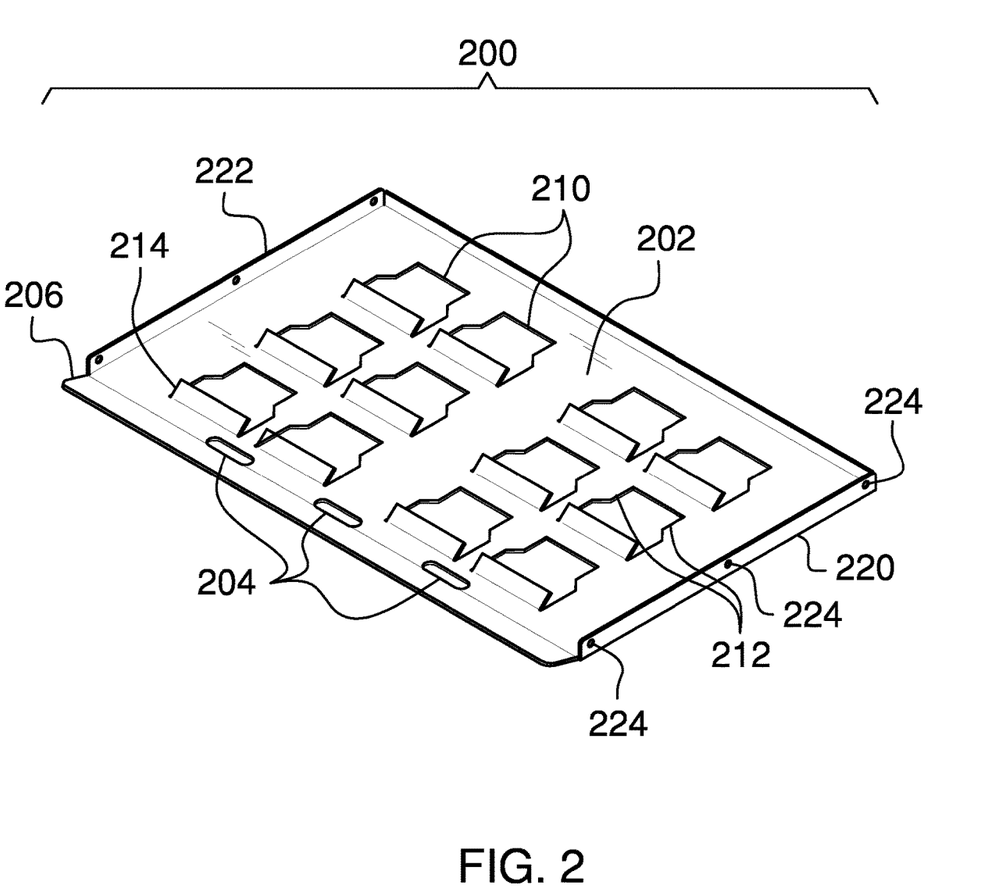
FIG. 2 is an isometric view of an embodiment of the disclosure illustrating the underside of a shelf.

The shelf 200 may comprise a shelf panel 202, a left mounting flange 220 and a right mounting flange 222. The shelf 200 may be a horizontally-oriented tray for supporting the mobile storage receptacle 900. The shelf panel 202 may be bent downwards on the left and right sides to form the left mounting flange 220 and the right mounting flange 222.

The shelf panel 202 may comprise a plurality of shelf slots 210 that may be operable to engage with the plurality of engaging members 910 on the mobile storage receptacle 900 to retain the mobile storage receptacle 900 to the shelf panel 202. An individual shelf slot selected from the plurality of shelf slots 210 may be an aperture through the shelf panel 202. The individual shelf slot may be rectangular in shape at the front of the individual shelf slot and may transition to a narrower rectangle at the rear of the individual shelf slot thus forming a pair of shelf slot ribs 212 on either side of the narrower end of the individual shelf slot. An individual engaging member 912 on the mobile storage receptacle 900 may pass down through the wide end of the individual shelf slot and may then be moved rearward towards the narrow end of the individual shelf slot such that the individual engaging member 912 on the mobile storage receptacle 900 may engage the pair of shelf slot ribs 212. The front end of the individual shelf slot may bend downwards to form a shelf slot lip 214. The shelf slot lip 214 may guide the individual engaging member 912 down into the individual shelf slot as the individual engaging member 912 moves rearward and/or may lift the individual engaging member out of the individual shelf slot up when sliding the mobile storage receptacle 900 rearward for removal.

Figure 3:
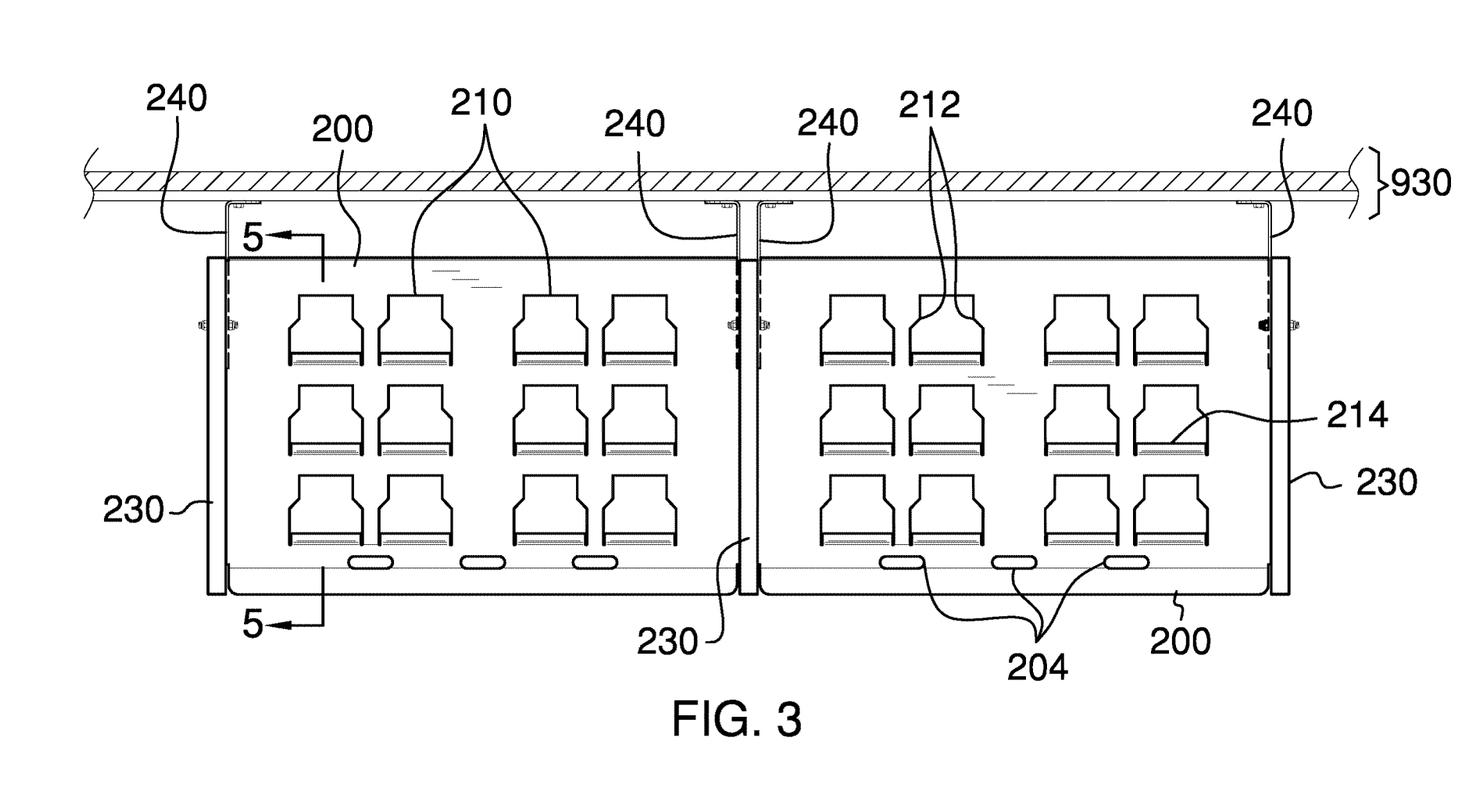
FIG. 3 is a top view of an embodiment of the disclosure illustrating two adjacent shelves.

The shelf panel 202 may comprise one or more shelf lock cut outs 204. The one or more shelf lock cut outs 204 may be rectangular apertures through the shelf panel 202. Once the plurality of engaging members 910 on the mobile storage receptacle 900 have engaged with the plurality of shelf slots 210 on the shelf panel 202, the locking tab 920 on the mobile storage receptacle 900 may be moved into one of the one or more shelf lock cut outs 204 to prevent the mobile storage receptacle 900 from decoupling from the shelf panel 202. A user may manually disengage the locking tab 920 in order to remove the mobile storage receptacle 900 from the shelf panel 202.

Figure 5:
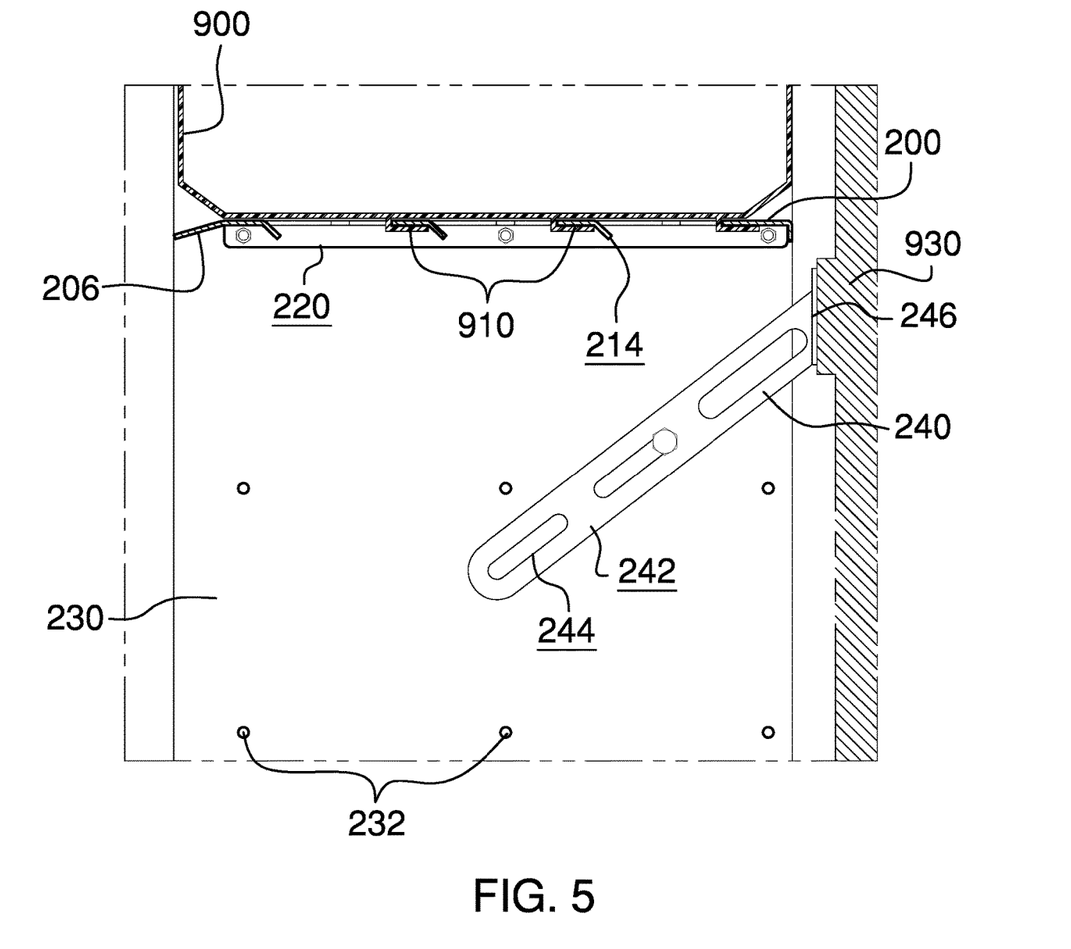
FIG. 5 is a cross-sectional view of an embodiment of the disclosure across 5-5 as shown in FIG. 3.

In some embodiments, the front of the shelf panel 202 may bend downwards at an oblique angle to form a shelf front lip 206. The shelf front lip 206 may guide the mobile storage receptacle 900 onto the shelf panel 202.

The left mounting flange 220 and the right mounting flange 222 may be vertically-oriented and perpendicular to the shelf panel 202. The left mounting flange 220 and the right mounting flange 222 may be coupled to the side walls 230 to hold the shelf 200 in place. An individual mounting flange selected from the left mounting flange 220 and the right mounting flange 222 may comprise a plurality of shelf mounting apertures 224.

Figure 4:
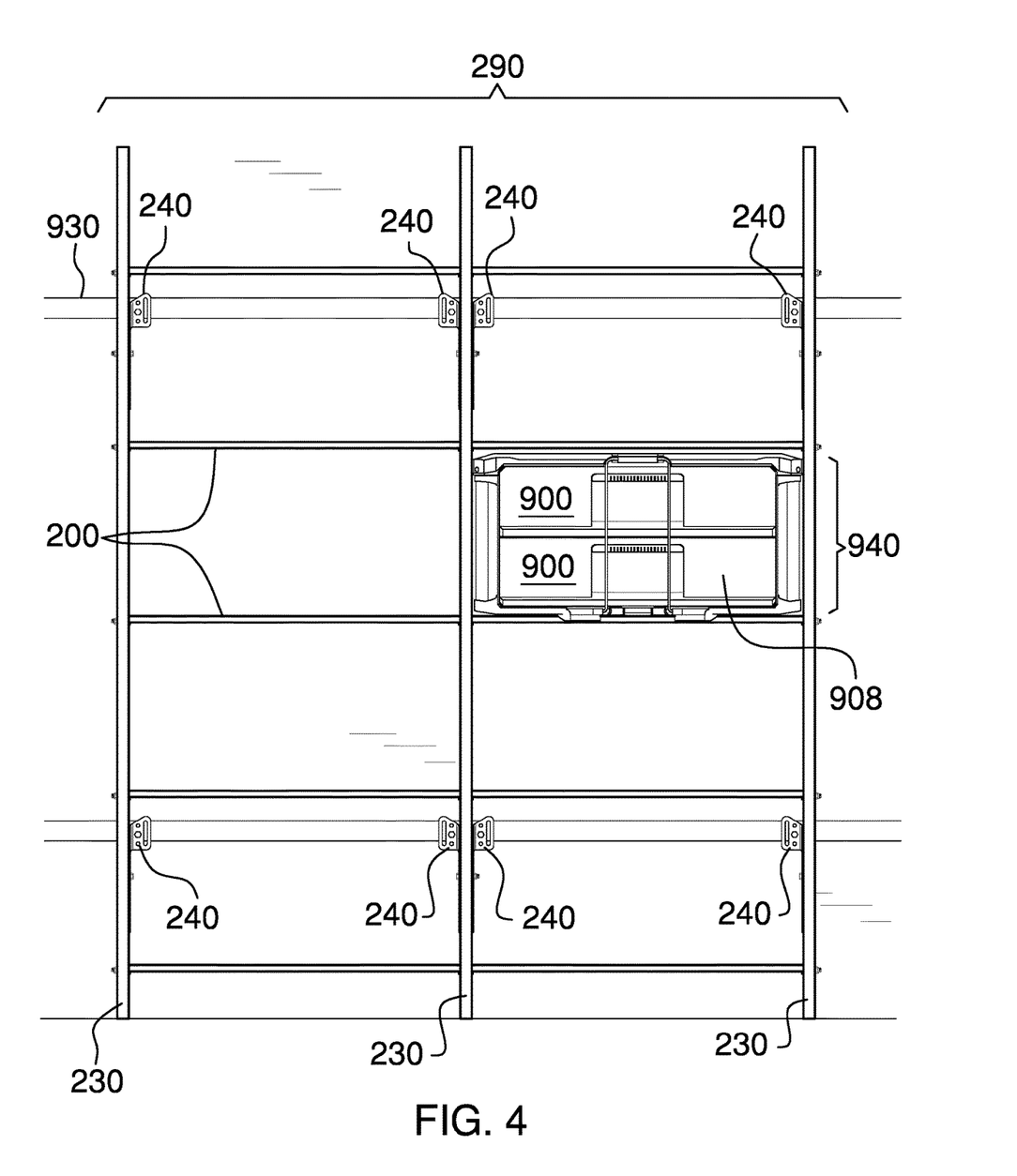
FIG. 4 is a front view of an embodiment of the disclosure illustrating two adjacent sets of shelves.

The side wall 230 may be a vertically-oriented panel. The side wall 230 may be operable as a left side wall, a right side wall, or an intermediate wall of the modular cabinet 290. The side wall 230 may comprise a plurality of side wall mounting apertures 232 which may be operable to couple the side wall 230 to one or more of the mounting brackets 240.

The mounting bracket 240 may be a mechanical support for the side wall 230. The mounting bracket 240 may comprise an arm 242 and a base 246. The arm 242 may be coupled to the base 246 such that the arm 242 and the base 246 form a right angle. The base 246 may be coupled to a rear support structure 930 and the arm 242 may be coupled to the side wall 230 with the side wall 230 oriented to be perpendicular to the rear support structure 930. In some embodiments, the arm 242 may be oriented at an oblique angle with respect to horizontal.

The arm 242 may comprise a plurality of mounting slots 244 for coupling to the side wall 230. The base 246 may comprise a plurality of mounting apertures 248 for coupling to the rear support structure 930. One or more of the plurality of mounting apertures 248 may be a vertically elongated slot 250. The rear mounting panel 260 may be a vertically-oriented panel to which the mobile storage receptacles 900 may couple.

Figure 6:
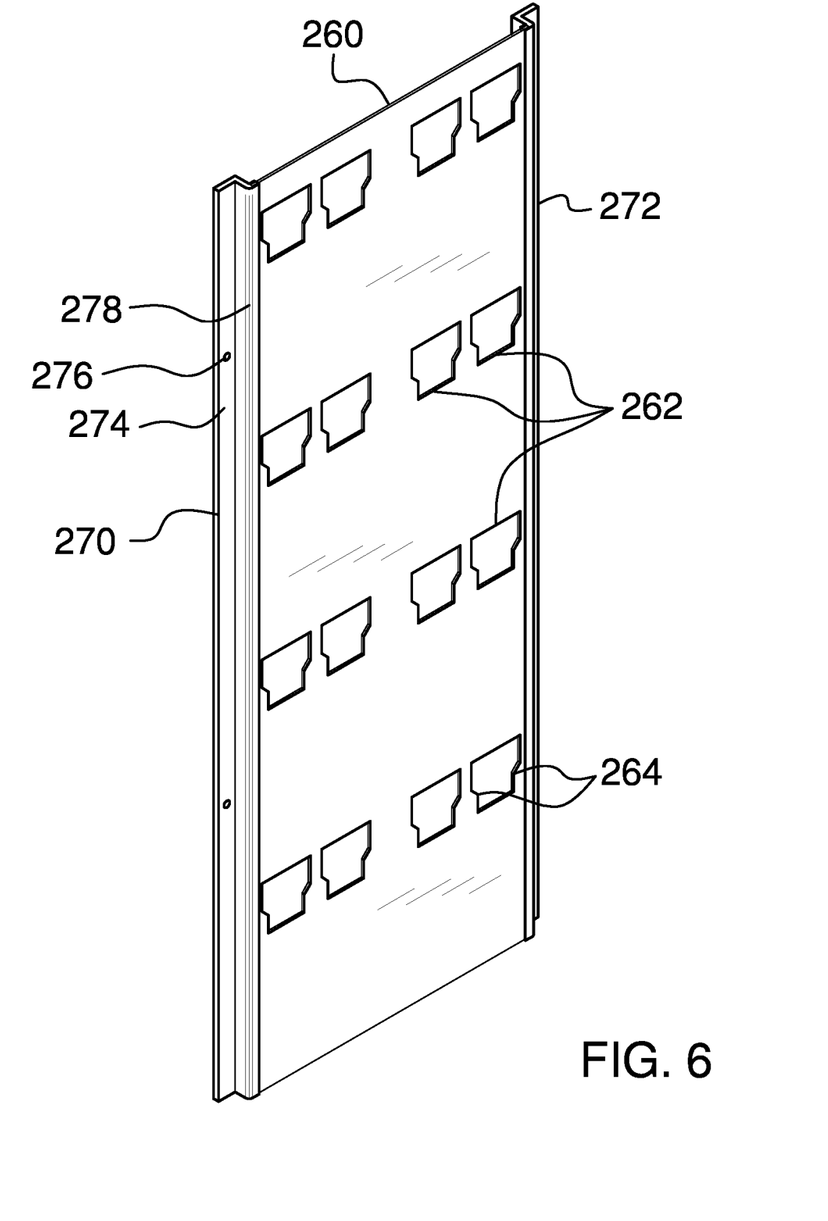
FIG. 6 is an isometric view of an embodiment of the disclosure illustrating a rear mounting panel.
Figure 8:
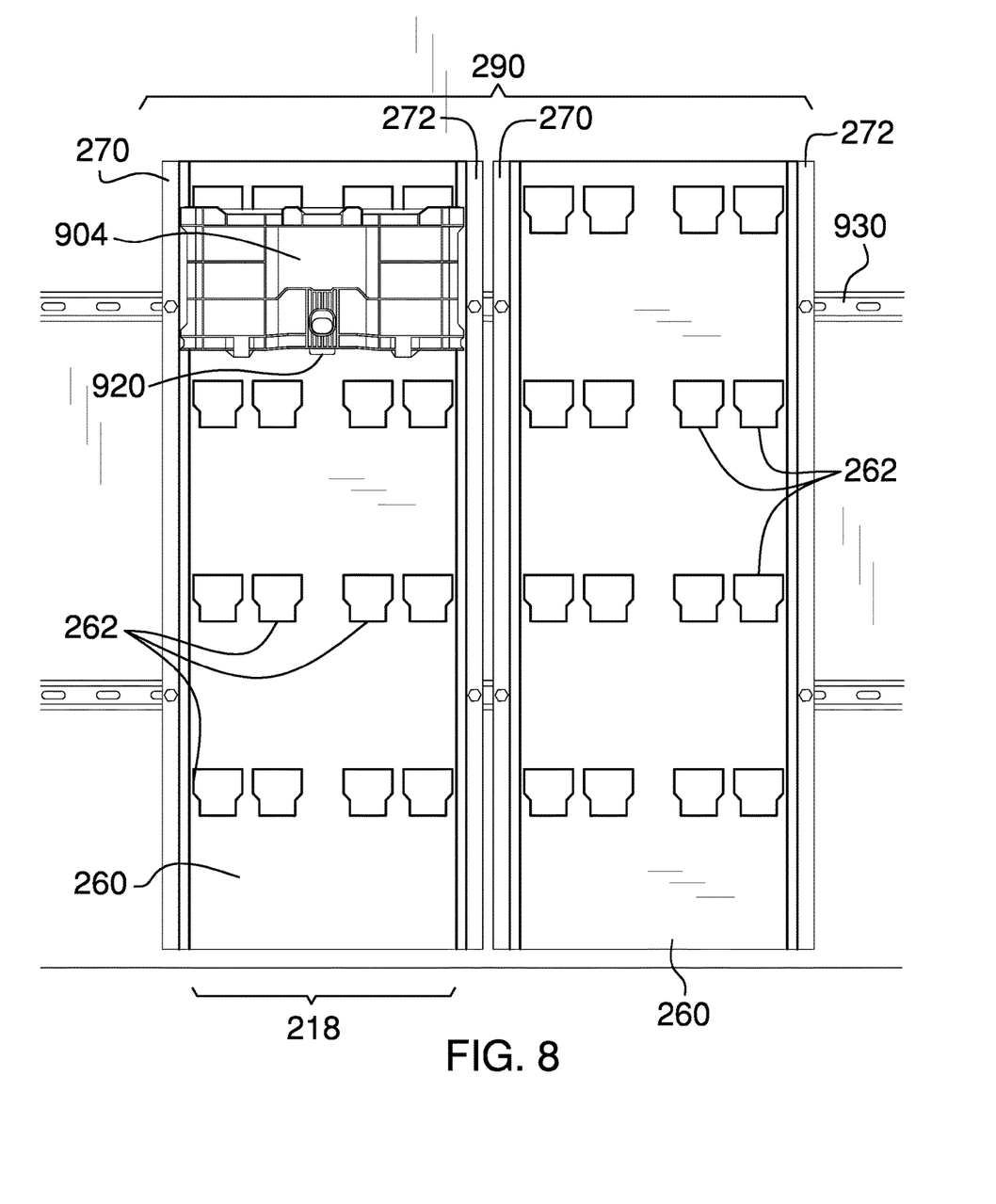
FIG. 8 is a front view of an embodiment of the disclosure illustrating adjacent double wide rear mounting panels.
Figure 9:
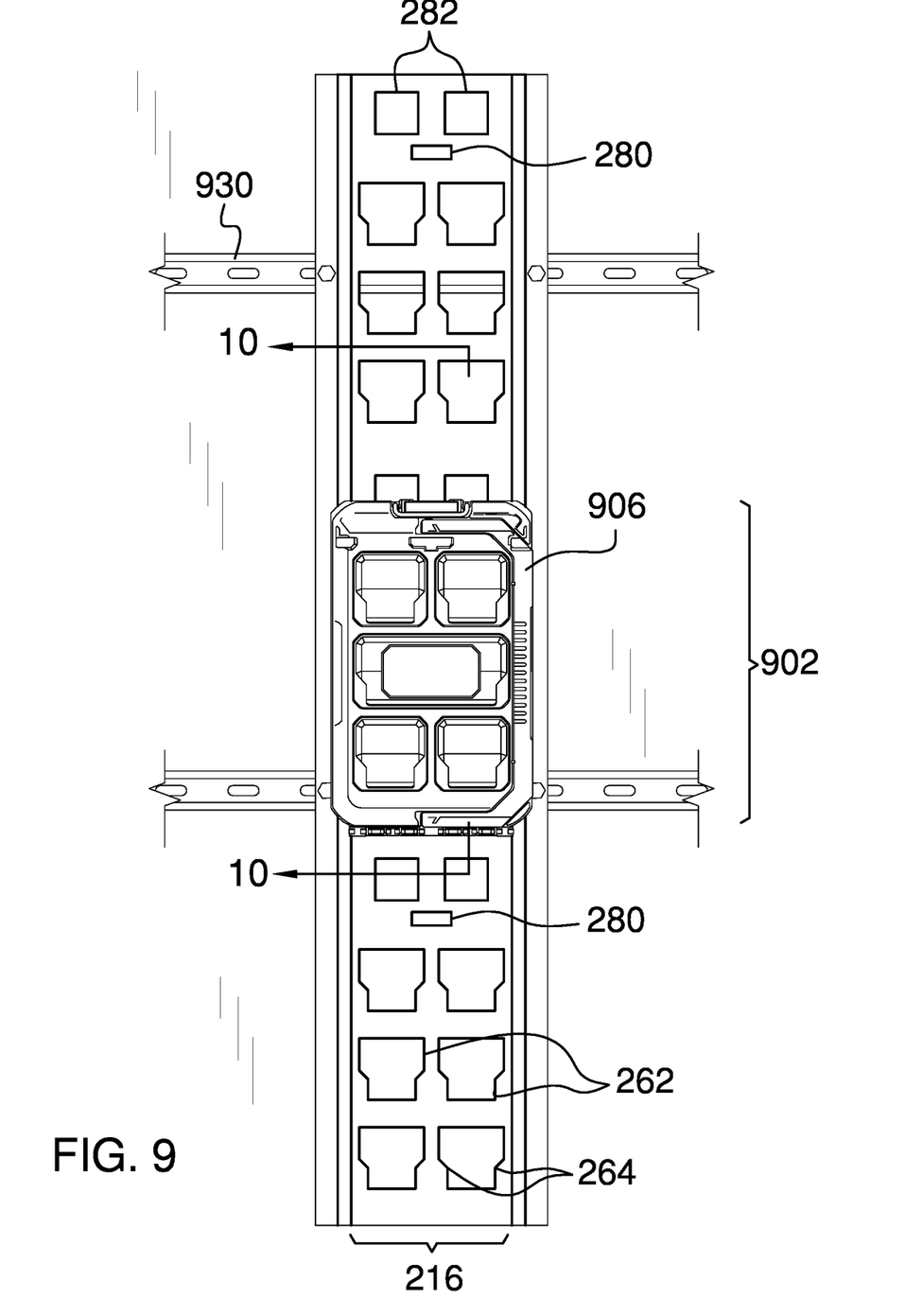
FIG. 9 is a front view of an embodiment of the disclosure illustrating a single wide rear mounting panel.

The rear mounting panel 260 may comprise a plurality of rear panel slots 262 that may be operable to engage with the plurality of engaging members 910 on the mobile storage receptacle 900 to retain the mobile storage receptacle 900 to the rear mounting panel 260. An individual rear panel slot selected from the plurality of rear panel slots 262 may be an aperture through the rear mounting panel 260. The individual rear panel slot may be rectangular in shape at the top of the individual rear panel slot and may transition to a narrower rectangle at the bottom of the individual rear panel slot thus forming a rear panel slot ribs 264 on either side of the narrower end of the individual rear panel slot. The individual engaging member 912 on the mobile storage receptacle 900 may pass rearward through the wide end of the individual rear panel slot and may then be moved down towards the narrow end of the individual rear panel slot such that the individual engaging member 912 on the mobile storage receptacle 900 may engage the rear panel slot ribs 264.

Figure 7:
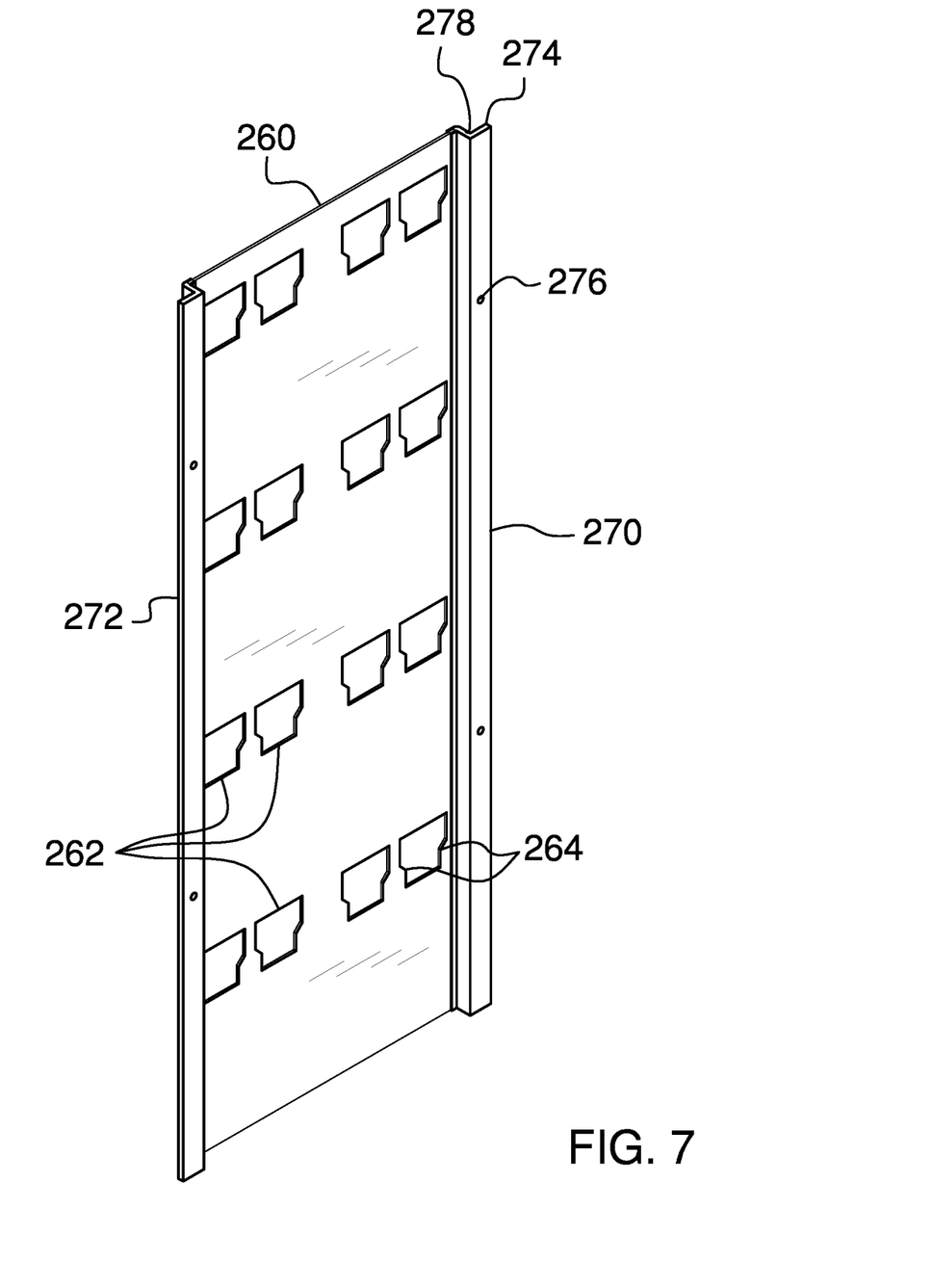
FIG. 7 is an isometric view of an embodiment of the disclosure illustrating the back side of a rear mounting panel.
Figure 10:
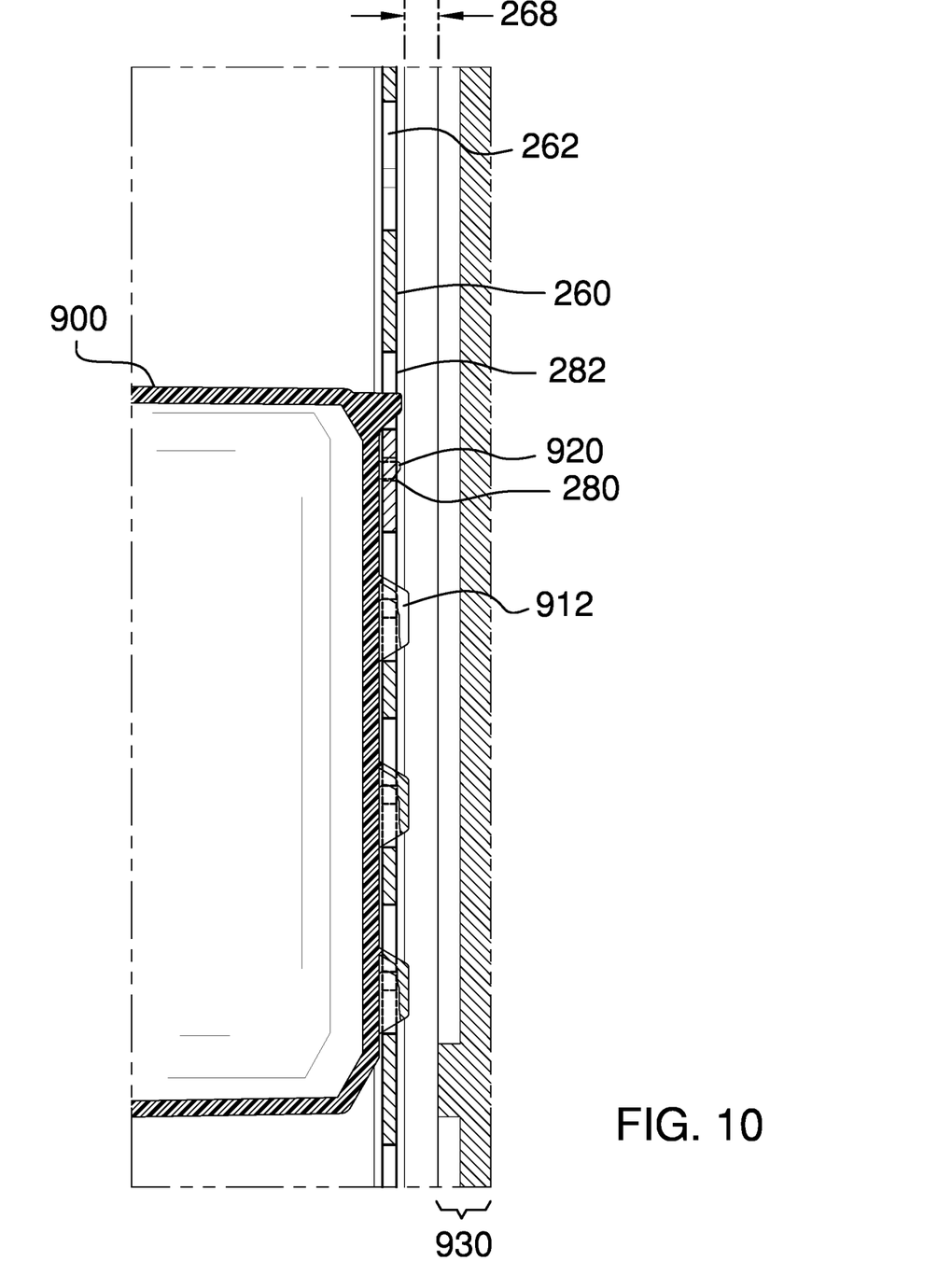
FIG. 10 is a cross-sectional view of an embodiment of the disclosure across 10-10 as shown in FIG. 9.

The rear mounting panel 260 may further comprise a left mounting standoff 270 and a right mounting standoff 272 which may couple the rear mounting panel 260 to the rear support structure 930 and may create a gap 268 between the rear mounting panel 260 and the rear support structure 930. An individual mounting standoff selected from the left mounting standoff 270 and the right mounting standoff 272 may comprise a mounting section 274 and a spacing section 278 which are perpendicular to each other. The mounting section 274 may comprise a plurality of standoff mounting apertures 276 for coupling to the rear support structure 930. The spacing section 278 may extend away from the rear support structure 930 and may couple to the rear mounting panel 260.

The rear mounting panel 260 may comprise one or more rear panel lock cut outs 280. The one or more rear panel lock cut outs 280 may be rectangular apertures through the rear mounting panel 260. Once the plurality of engaging members 910 on the mobile storage receptacle 900 have engaged with the plurality of rear panel slots 262 on the rear mounting panel 260, the locking tab 920 on the mobile storage receptacle 900 may be moved into one of the one or more rear panel lock cut outs 280 to prevent the mobile storage receptacle 900 from decoupling from the rear mounting panel 260. The user may manually disengage the locking tab 920 in order to remove the mobile storage receptacle 900 from the rear mounting panel 260.

The rear mounting panel 260 may comprise one or more receptacle protrusion cut outs 282. The one or more receptacle protrusion cut outs 282 may be apertures to provide clearance for features on the mobile storage receptacle 900 that project away from the mobile storage receptacle 900 such that the features of the mobile storage receptacle 900 would create mechanical interference with the modular cabinet 290 if the one or more receptacle protrusion cut outs 282 were not available.

The shelves 200 and the rear mounting panels 260 may be available in multiple widths to match the sizes of the mobile storage receptacles 900. As non-limiting examples, the shelves 200 and the rear mounting panels 260 may be single wide 216 to retain a single width storage receptacle 906 and double wide 218 to retain a double width storage receptacle 908. The shelves 200 and the rear mounting panels 260 that are double wide 218 may also be operable to retain two of the mobile storage receptacles 900 side-by-side.

The shelf 200, the side wall 230, the mounting bracket 240, and the rear mounting panel 260 may be made of metal having a sufficient rigidity to avoid buckling under the weight of the mobile storage receptacles 900 and their contents. The mounting brackets 240 may be coupled to the rear support structure 930 and to the side walls 230 and the shelves 200 may be coupled to the side walls 230 using mounting hardware such as nuts, bolts, flat washers, lock washers, and screws.

In use, the mounting brackets 240 may be coupled to the rear support structure 930, the side walls 230 may be coupled to the mounting brackets 240, and the shelves 200 may be coupled between the side walls 230 to create a modular cabinet 290 with horizontal storage surfaces. One or more mobile storage receptacles 900 may then be securely coupled to the shelves 200.

Alternatively, the rear mounting panels 260 may be coupled to the rear support structure 930 to create a modular cabinet 290 with vertical storage surfaces. One or more mobile storage receptacles 900 may then be securely coupled to the rear mounting panels 260.

The side walls 230, the mounting brackets 240, the shelves 200, and the rear mounting panel 260 may be used simultaneously to create, a modular cabinet 290 with both horizontal and vertical storage surfaces.

More than two of the side walls 230 may be used to create sections of shelving that share intermediate side walls (as shown in FIG. 4).

Mobile storage receptacles 900 may couple to the modular cabinet 290 using the plurality of engaging members 910 on the bottom of the mobile storage receptacle 900 or the plurality of engaging members 910 on the rear of the mobile storage receptacle 900. As non-limiting examples, a tool box 902 may couple to a shelf 200 using the plurality of engaging members 910 on the bottom of the tool box 902, a storage crate 904 may couple to a rear mounting panel 260 using the plurality of engaging members 910 on the rear of the storage crate 904, and the tool box 902 may be turned on edge and coupled to the rear mounting panel 260 using the plurality of engaging members 910 on the bottom of the tool box 902.

In some cases, the mobile storage receptacles 900 may be capable of coupling to each other in a stacked configuration 940 and the invention 100 may be operable to store the stacked configurations 940.

DEFINITIONS

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface. Aperture may be synonymous with hole, slit, crack, gap, slot, or opening.

As used herein, the words "couple", "couples", "coupled" or "coupling", may refer to connecting, either directly or indirectly, and does not necessarily imply a mechanical connection.

As used in this disclosure, a "flange" may be a protruding rib, edge, or collar that is used to hold an object in place or to attach a first object to a second object.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, the term "intermediate" may refer to a location that lies between a first object and a second object As used herein, "mounting hardware" may refer to mechanical devices that are used to attach one object to another, including devices whose only purpose is to improve aesthetics. As non-limiting examples, mounting hardware may include screws, nuts, bolts, washers, rivets, crossbars, hooks, collars, nipples, cams, standoffs, knobs, caps, plates, rails, lips, and brackets.

As used herein, "oblique angle" may refer to any angle that is not a right angle or a multiple of a right angle.

As used in this disclosure, a "tool" may be a device, an apparatus, or an instrument that is used to carry out an activity, operation, or procedure.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 10, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A modular cabinet for use with mobile storage receptacles comprising:
   a shelf, a side wall, a mounting bracket, and a rear mounting panel;
   wherein the shelf, the side wall, the mounting bracket, the rear mounting panel, or any combination thereof are assembled into the modular cabinet and retain one or more mobile storage receptacles;
   wherein a plurality of engaging members on each said mobile storage receptacle engage with the shelf or with the rear mounting panel to retain the mobile storage receptacle to the modular cabinet;
   wherein the shelf is further defined with a shelf panel;
   wherein the shelf panel comprises a plurality of shelf slots that are operable to engage with the plurality of engaging members on the mobile storage receptacle to retain the mobile storage receptacle to the shelf panel;
   wherein an individual shelf slot selected from the plurality of shelf slots is an aperture through the shelf panel;
   wherein a front of the individual shelf slot bends downwards to form a shelf slot lip;
   wherein the shelf slot lip guides one said engaging member down into the individual shelf slot as the individual engaging member moves rearward and/or lifts the one said engaging member out of the individual shelf slot up when sliding the mobile storage receptacle forward for removal;
   wherein the rear mounting panel further comprises a left mounting standoff and a right mounting standoff which couple the rear mounting panel to a rear support structure and creates a gap between the rear mounting panel and the rear support structure;
   wherein an individual mounting standoff selected from the left mounting standoff and the right mounting standoff comprises a mounting section and a spacing section which are perpendicular to each other;
   wherein the side wall comprises a plurality of side wall mounting apertures which are operable to couple the side wall to the mounting bracket;
   wherein the mounting bracket is a mechanical support for the side wall;
   wherein the mounting bracket comprises an arm and a base;
   wherein the arm is coupled to the base such that the arm and the base form a right angle;
   wherein the arm is oriented at an oblique angle with respect to horizontal.

2. The modular cabinet for use with mobile storage receptacles according to claim 1
   wherein the shelf comprises the shelf panel, a left mounting flange and a right mounting flange;
   wherein the shelf is a horizontally-oriented tray for supporting at least one said mobile storage receptacle;
   wherein the shelf panel is bent downwards on left and right sides thereof to form the left mounting flange and the right mounting flange.

3. The modular cabinet for use with mobile storage receptacles according to claim 2
   wherein the individual shelf slot is rectangular in shape at the front of the individual shelf slot and transitions to a narrower rectangle at a rear of the individual shelf slot thus forming a pair of shelf slot ribs on either side of the narrower rectangle of the individual shelf slot;
   wherein the one said engaging member on the mobile storage receptacle passes down through the front of the individual shelf slot and is then moved rearward towards the rear of the individual shelf slot such that the one said engaging member on the mobile storage receptacle engages the pair of shelf slot ribs.

4. The modular cabinet for use with mobile storage receptacles according to claim 3
   wherein the shelf panel comprises one or more shelf lock cut outs;
   wherein the one or more shelf lock cut outs are rectangular apertures through the shelf panel;
   wherein once the plurality of engaging members on the mobile storage receptacle have engaged with the plurality of shelf slots on the shelf panel, a locking tab on the mobile storage receptacle is moved into one of the one or more shelf lock cut outs to prevent the mobile storage receptacle from decoupling from the shelf panel.

5. The modular cabinet for use with mobile storage receptacles according to claim 4
   wherein the front of the shelf panel bends downwards at an oblique angle to form a shelf front lip;
   wherein the shelf front lip guides the mobile storage receptacle onto the shelf panel.

6. The modular cabinet for use with mobile storage receptacles according to claim 5
   wherein the left mounting flange and the right mounting flange are vertically-oriented and perpendicular to the shelf panel;
   wherein the left mounting flange and the right mounting flange are coupled to the side walls to hold the shelf in place;
   wherein an individual mounting flange selected from the left mounting flange and the right mounting flange comprises a plurality of shelf mounting apertures.

7. The modular cabinet for use with mobile storage receptacles according to claim 6
   wherein the side wall is a vertically-oriented panel;
   wherein the side wall is operable as a left side wall, a right side wall, or an intermediate wall of the modular cabinet.

8. The modular cabinet for use with mobile storage receptacles according to claim 7
wherein the base is coupled to the rear support structure and the arm is coupled to the side wall with the side wall oriented to be perpendicular to the rear support structure.

9. The modular cabinet for use with mobile storage receptacles according to claim 8
wherein the arm comprises a plurality of mounting slots for coupling to the side wall;
wherein the base comprises a plurality of mounting apertures for coupling to the rear support structure;
wherein one or more of the plurality of mounting apertures is a vertically elongated slot.

10. The modular cabinet for use with mobile storage receptacles according to claim 9
wherein the rear mounting panel is a vertically-oriented panel to which the mobile storage receptacles couple;
wherein the rear mounting panel comprises a plurality of rear panel slots that are operable to engage with the plurality of engaging members on the mobile storage receptacle to retain the mobile storage receptacle to the rear mounting panel.

11. The modular cabinet for use with mobile storage receptacles according to claim 10
wherein an individual rear panel slot selected from the plurality of rear panel slots is an aperture through the rear mounting panel;
wherein the individual rear panel slot is rectangular in shape at a top of the individual rear panel slot and transitions to a narrower rectangle at a bottom of the individual rear panel slot thus forming rear panel slot ribs on either side of the narrower rectangle of the individual rear panel slot;
wherein the one said engaging member on the mobile storage receptacle passes rearward through the top of the individual rear panel slot and is then moved down towards the bottom of the individual rear panel slot such that the individual engaging member on the mobile storage receptacle engages the rear panel slot ribs.

12. The modular cabinet for use with mobile storage receptacles according to claim 11
wherein the mounting section comprises a plurality of standoff mounting apertures for coupling to the rear support structure.

13. The modular cabinet for use with mobile storage receptacles according to claim 12
wherein the spacing section extends away from the rear support structure and couples to the rear mounting panel.

14. The modular cabinet for use with mobile storage receptacles according to claim 13
wherein the rear mounting panel comprises one or more rear panel lock cut outs;
wherein the one or more rear panel lock cut outs are rectangular apertures through the rear mounting panel;
wherein once the plurality of engaging members on the mobile storage receptacle have engaged with the plurality of rear panel slots on the rear mounting panel, a locking tab on the mobile storage receptacle is moved into one of the one or more rear panel lock cut outs to prevent the mobile storage receptacle from decoupling from the rear mounting panel.

15. The modular cabinet for use with mobile storage receptacles according to claim 14
wherein the rear mounting panel comprises one or more receptacle protrusion cut outs;
wherein the one or more receptacle protrusion cut outs are apertures to provide clearance for features on the mobile storage receptacle that project away from the mobile storage receptacle such that the features of the mobile storage receptacle would create mechanical interference with the modular cabinet if the one or more receptacle protrusion cut outs were not available.

16. The modular cabinet for use with mobile storage receptacles according to claim 15
wherein the shelf and the rear mounting panel are available in multiple widths to match sizes of the mobile storage receptacles;
wherein the shelves and the rear mounting panels are single wide to retain a single width storage receptacle and double wide to retain a double width storage receptacle;
wherein the shelf and the rear mounting panel that are double wide are also operable to retain two of the mobile storage receptacles side-by-side.

* * * * *